US005295124A

United States Patent [19]
Shirako

[11] Patent Number: 5,295,124
[45] Date of Patent: Mar. 15, 1994

[54] OPTICAL RECORDING APPARATUS

[75] Inventor: Yukio Shirako, Tokyo, Japan

[73] Assignee: Sony Corporation, Tokyo, Japan

[21] Appl. No.: 901,856

[22] Filed: Jun. 22, 1992

[30] Foreign Application Priority Data

Jun. 24, 1991 [JP] Japan .................... 3-178825

[51] Int. Cl.$^5$ .......................... G11B 17/22
[52] U.S. Cl. ........................ 369/32; 369/54; 369/84; 369/124; 369/47; 369/48
[58] Field of Search ............. 369/32, 33, 56, 58, 369/54, 84, 47, 48, 124

[56] References Cited

U.S. PATENT DOCUMENTS

| 5,164,931 | 11/1993 | Yamaguchi et al. | 369/32 |
| 5,177,720 | 1/1993 | Kondo | 369/32 |
| 5,191,567 | 3/1993 | Yasuda et al. | 369/32 |
| 5,195,068 | 3/1993 | Morishima | 369/32 |

Primary Examiner—Robert J. Pascal
Assistant Examiner—R. A. Ratliff
Attorney, Agent, or Firm—Philip M. Shaw, Jr.

[57] ABSTRACT

An optical recording apparatus employing a method of halting a recording operation halfway a unitary frame of additional information and capable of realizing an exact operation in recording the additional information at the joint of preceding and present record portions. Out of the last unitary frame of the additional information in the preceding operation, the remaining information portion not included in the preceding record is generated, at the beginning of an additional recording mode, by an address information generator 4 from the content stored in an address information memory 6. And at the restart of recording the additional information, the recording operation is so performed that the remaining portion of the preceding last unitary frame of the additional information generated by the address information generator 4 is recorded in succession to the preceding record portion 24 Claims, 5 Drawing Sheets

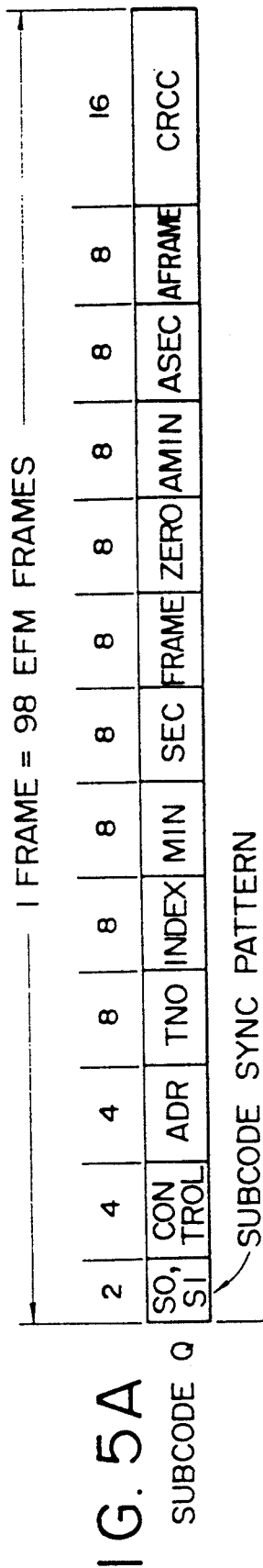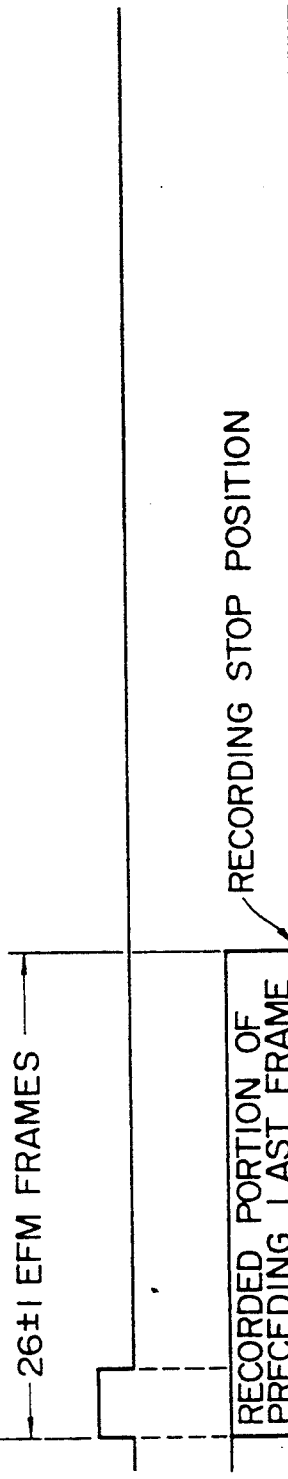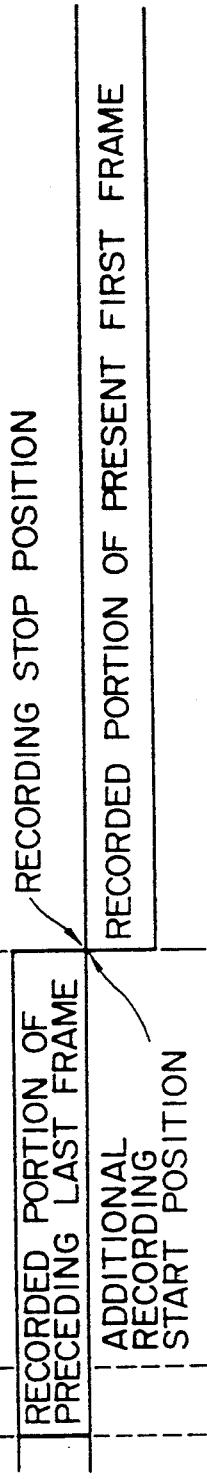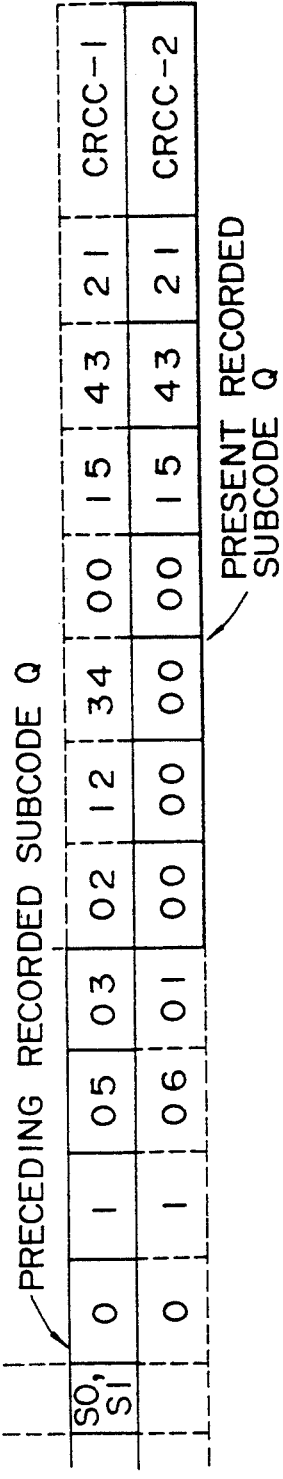

OPTICAL RECORDING APPARATUS

BACKGROUND OF THE INVENTION

1. Field of the Invention

The present invention relates to an optical recording apparatus adapted for use in recording information on a write-once type compact disc (CD) where additional recording is possible merely once.

2. Description of the Prior Art

In a CD, a subcode is recorded in addition to audio data in such a manner as to be included in a predetermined amount of record data to constitute one unitary frame of information.

FIG. 4 shows a format of record signals constituting a unitary information frame of a subcode. In recording information on a CD, there are sequentially recorded EFM frames each composed of a total of 588 bits which comprise, in the direction of a time series, a 24-bit frame sync signal (FS), and 8-bit subcode, data of 6 samples×2 channels, and a data portion consisting of parity bits thereof (DATA).

As shown in FIG. 4, 1 frame is composed of 98 EFM frames. And in the data of each frame, there are included 8 subcodes ranging from P to W. One bit of each of such subcodes P to W is contained in 1 EFM frame, and 1 information unit is constituted of 1 frame (98 EFM frames=98 of each subcode bits).

Out of such 8 subcodes, the subcode Q serves as address information consisting of a track number (e.g. program number) and time information. FIG. 5A shows the content of 1 frame corresponding to 1 information unit of the subcode Q, in which the first 2 bits S0, S1 are used as a subcode sync pattern; the next 4 bits are used as control bits CONTROL indicating the presence or absence of preemphasis and the type thereof; the next 4 bits as an address ADR; the next 8 bits as a track number TNO; next 8 bits as index information INDEX; the next 24 bits represent the elapse time of the relevant program (8-bit minute value MIN, 8-bit second value SEC, and 8-bit frame number value FRAME); the next 8 bits are composed entirely of bits-0 and are not used; the next 24 bits represent the absolute elapse time from the beginning of the disc (8-bit minute value AMIN, 8-bit second value ASEC, and 8-bit frame number value AFRAME); and the last 16 bits are used as an error detecting CRC code generated for the 1-frame of subcode except the sync pattern.

In a write-once type CD also, the signal recording format is exactly the same as that of the ordinary CD mentioned above. However, in the write-once type CD where additional recording is performed, there arises a problem with regard to the joint between the preceding record portion and the present record portion. In the standard (orange book) for the write-once type CD, it is prescribed that, when the recording has been stopped, the last frame of the record data is to include 26±1 EFM frames (FIG. 5C) from the first subcode sync pattern (FIG. 5B) of 1 frame.

In the recording apparatus designed for such write-once type CD, a technique may be so contrived that, when the recording operation is stopped and then resumed as shown in FIG. 5C, the data after 26±1 EFM frames from the subcode sync pattern in the first frame of the new portion is recorded in succession to the preceding record portion so that both data can be joined together seamlessly.

In this case, the practical data at the joint are such as those shown in FIG. 5D. Namely, the subcode Q of the preceding last frame denotes a track number [5], [02] minutes, [12] seconds, [34] frames, and an absolute time of [15] minutes, [43] seconds, [21] frames; whereas the data recorded in actual practice is the index data [0 1 05 03] except the information denoting the track number and the absolute time represented by solid lines in FIG. 5D.

Meanwhile the subcode Q of the first frame of the data to be recorded in succession to the aforementioned preceding record portion denotes an increased track number [06], [00] minute, [00] second, [00] frame, and an absolute time of [15] minutes, [43] seconds, [21] frames. However, the data recorded in actual practice include the time data represented by solid lines in FIG. 5D and an error detecting code CRC-2 relative to the subcode Q of the first frame of the data to be recorded additionally.

Therefore the subcode Q of the frame at the joint is rendered indefinite. Since the error detecting code CRC-2 recorded as the subcode Q of one frame at the joint is generated with regard to the subcode Q of the first frame of the data to be additionally recorded, it follows that the subcode Q of the first frame is detected as an error by the error detecting code CRC-2. However, as the CRC code is effective merely for error detection and not for error correction, the subcode Q of the frame at the joint is discarded without being used.

Consequently the apparatus is kept free from a malfunction due to the above, but it becomes impossible to properly obtain the address information which is the subcode Q of the first frame at the restart of the recording operation. Besides, there may occur another disadvantage that accurate reading of the subcode is rendered impossible because of some dust or flaw. And in case the subcode Q fails to be read accurately in the successive frames, exact arrival at the proper position is not achievable when such portion is searched, or a long time may be required for arrival at the desired position.

The problems described above arise with regard to other subcodes as well as the aforementioned subcode Q.

OBJECT AND SUMMARY OF THE INVENTION

In view of the circumstances mentioned, it is an object of the present invention to provide an improved optical recording apparatus which is capable of performing, in an additional recording mode, an exact operation to record additional data such as subcodes in a disc portion at the restart of the recording operation.

In an attempt to solve the above problems, an improvement has been accomplished in an optical recording apparatus for additional information whose unitary frame is composed of a predetermined number of bits, wherein the additional information can be recorded in such a manner that, when the recording operation is brought to a halt, the recording is stopped halfway into the unitary information frame.

In such improvement, there are provided means for generating, out of the last unitary frame of the additional information in the preceding operation, at least the remaining information portion not included in the preceding record. And at the restart of the recording operation, the remaining portion of the preceding last unitary frame of the additional information is so recorded as to join exactly to the preceding record portion.

According to one aspect of the present invention, there is provided an apparatus for recording additional information with a record signal on a recording medium, the apparatus comprising receiving means for receiving the record signal, first generating means for generating first additional information, a first memory for storing at least a remaining portion of the first additional information obtained from the first generating means, and recording means for recording the first additional information and the record signal on the recording medium. A control means for controls operations of the first generating means, the recording means and the first memory so that the first generating means and the recording means stop operation of the recording means after a first portion of the first additional information obtained from the first generating means is recorded on the recording medium. The control means further controls the recording means and the first memory to restart operation of the recording means so that the remaining portion of the first additional information from the first memory can be recorded in succession to the first portion of the first additional information.

The above and other features and advantages of the present invention will become apparent from the following description which will be given with reference to the illustrative accompanying drawings.

BRIEF DESCRIPTION OF THE DRAWINGS

FIGS. 5(A-D) is a schematic diagram for explaining a conventional recording method.

DESCRIPTION OF THE PREFERRED EMBODIMENTS

Figure 1:
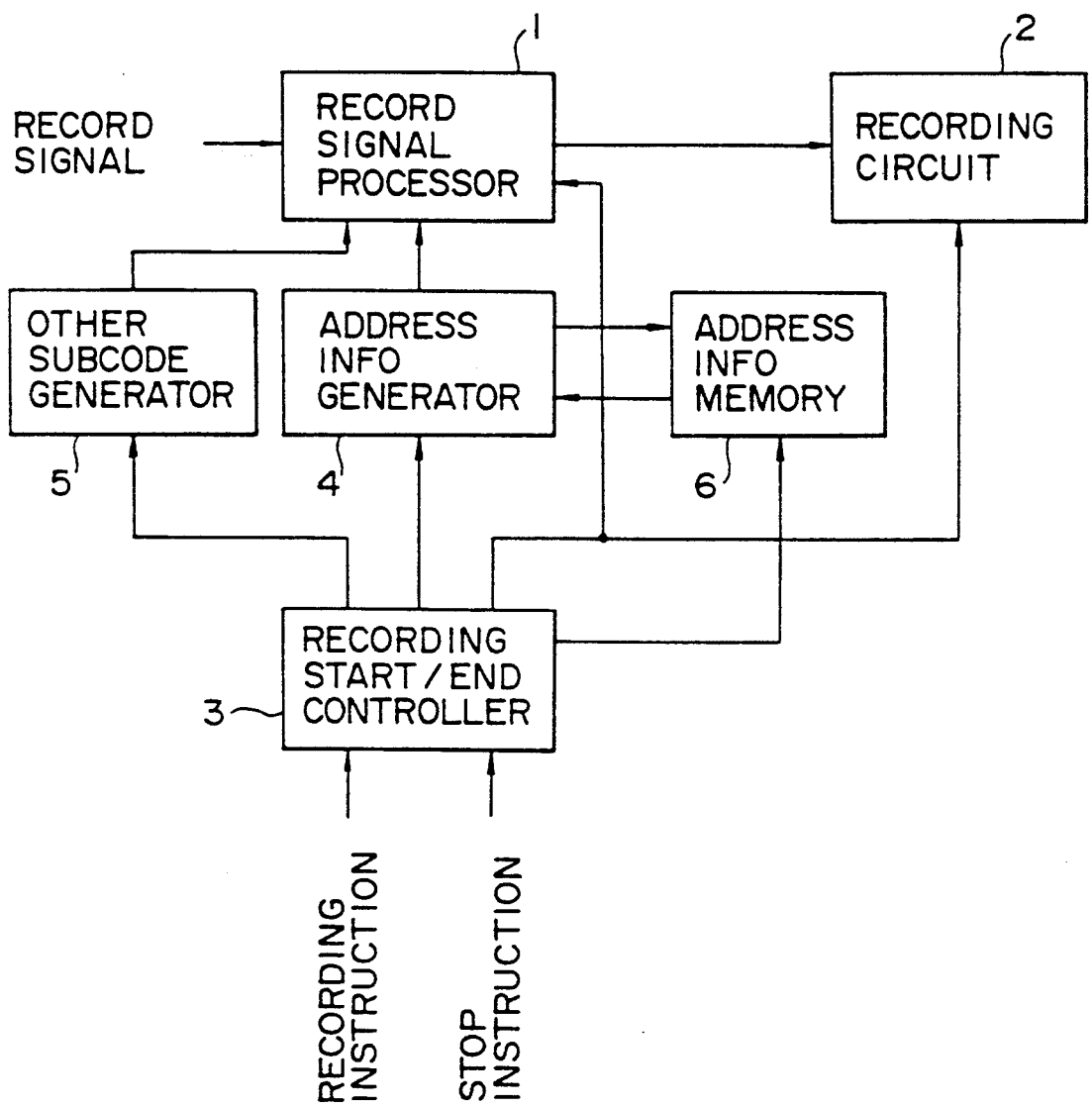
FIG. 1 is a block diagram of an exemplary embodiment representing the optical recording apparatus of the present invention.

FIG. 1 is a block diagram of a first embodiment representing the optical recording apparatus of the present invention. This embodiment relates to an exemplary case of performing an additional recording operation, after a halt of a preceding operation, in succession to an anterior recorded portion without replacement of the disc.

In FIG. 1, a record signal such as an audio signal is supplied to a record signal processor 1, while information of a subcode Q obtained from an address information generator 4 and information of other subcodes P, R to W from other subcode generators 5 are supplied also to the record signal processor 1. Then the signal processor 1 generates, out of such input signals received, a signal of a predetermined format adapted to be recorded on a CD.

In this embodiment, the address information generator 4 generates address information which is the data of a subcode Q of a next frame (n+1) posterior to the frame (n) being recorded, and then supplies the address information to the record signal processor 1 while storing the same in an address information memory 6.

The above procedure is repeated during the recording mode and, at a stop of the recording operation, the address information of the last frame is stored in the address information memory 6.

The CD format signal obtained from the record signal processor 1 is supplied to a recording circuit 2 where the CD format signal is additionally recorded on the disc.

The record signal processor 1, the recording circuit 2, the address information generator 4 and the other subcode generator 5 are controlled by a recording start-/end controller 3 at a recording start point and a recording end point. The controller 3 consists of, for example, a microcomputer to which a recording instruction and a stop instruction are supplied. When a stop instruction is input, as described above, the recording circuit 2 is so controlled that the recording operation is terminated at the $(26\pm1)$th EFM frame from the top of the last frame of the record signal. In this stage, the address information of the last frame of the record signal is stored and held in the address information memory 6.

Although not shown in FIG. 1, the other subcode generator 5 has, similarly to the subcode Q, a memory for storing the subcode generated therefrom, whereby the subcode of the last frame is stored and held in such memory.

Figure 2:
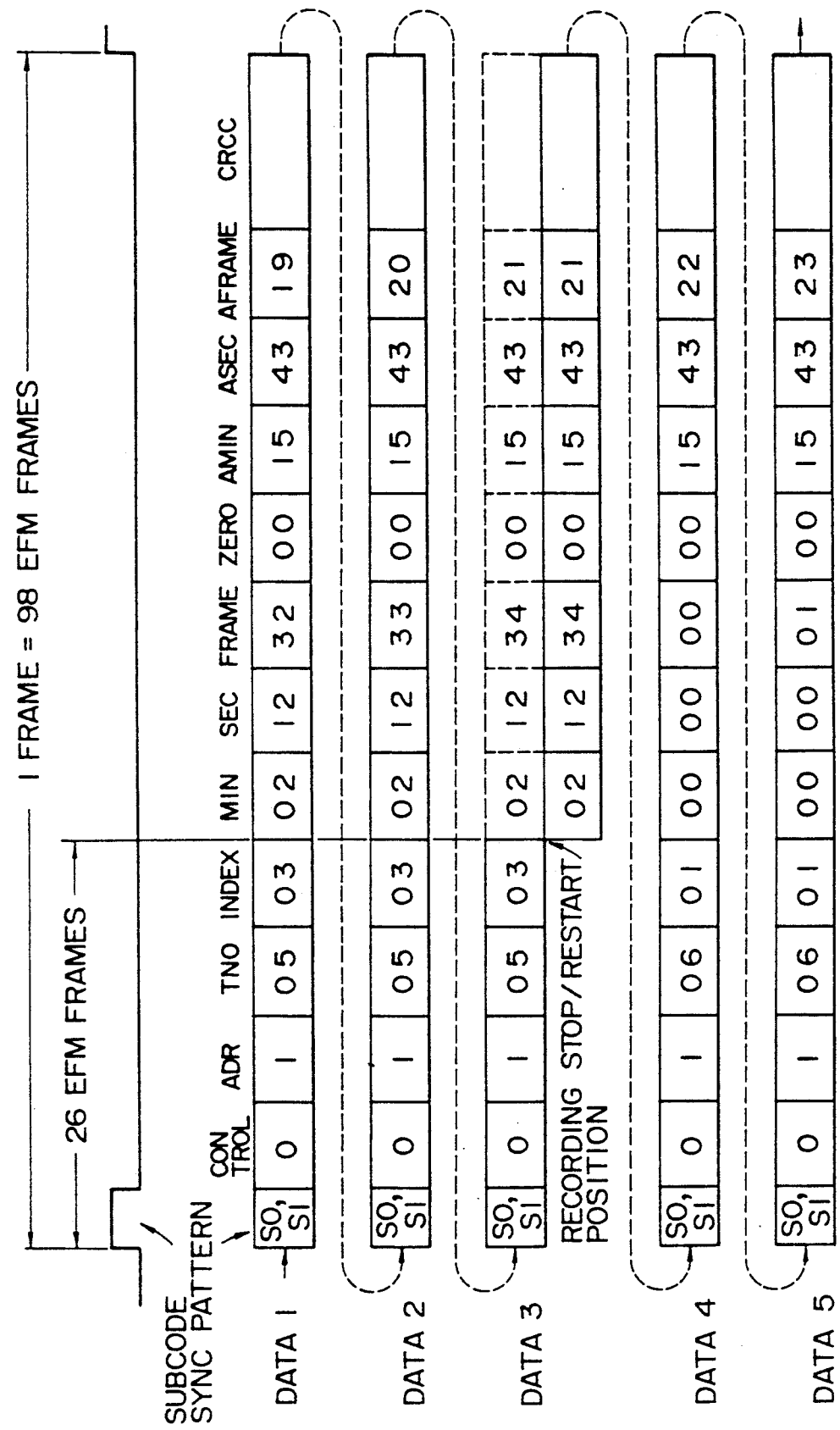
FIG. 2 is a timing chart of data for explaining the operation of the present invention.

Referring now to FIG. 2, a description will be given on how the address information (subcode Q) is additionally recorded.

Suppose now that a stop instruction is supplied to the controller 3 when the data 2 is being recorded as the 1-frame of data of the subcode Q or address information in succession to the data 1, as shown in FIG. 2. Then the controller 3 outputs a command to stop the operation of the address information generator 4. In response to the command thus received, the address information generator 4 halts generation of the address information after generating next-frame data 3 shown in FIG. 2, whereby the data 3 is stored in the address information memory 6 while being supplied to the record signal processor 1. In this embodiment, the other subcode generator 5 is also controlled exactly in the same manner as the above.

Upon arrival of the recording stop position after passage of, e.g. 26 EFM frames from the top of the frame of the data 3 as shown in FIG. 2, the recording start/end controller 3 outputs a recording stop command to the recorder 2 so as to stop the recording operation. It follows therefore that [S0, S1, 0, 1, 05, 03] of the data 3 denoted by solid lines in FIG. 2 are recorded on the disc.

When a recording instruction is supplied to the recording start/end controller 3 for restarting the recording operation, the controller 3 outputs a recording restart command to the address information generator 4. Then the address information generator 4 reads out the address information data 3 (FIG. 2) of the last frame of the preceding record data stored in the address information memory 6, and supplies the data 3 to the record signal processor 1. Similarly the controller 3 outputs a recording restart command to the other subcode generator 5, which then reads out the subcodes P and R to W of the last frame of the preceding record data stored in the memory thereof and supplies the subcode data to the record signal processor 1.

The record signal processor 1 generates record data posterior to 26 EFM frames, inclusive of the remaining subcode portion posterior to the nonrecorded 26 EFM frames out of the preceding last frame. Upon arrival of the recording restart position on the disc shown in FIG. 2, the controller 3 supplies a recording start command to both the record signal processor 1 and the recording circuit 2, thereby restarting the recording operation. Therefore, the data posterior to the aforementioned 26 EFM frames is recorded on the disc in succession to the preceding recorded data (anterior to the 26 EFM frames of one frame), whereby one frame is completed at the joint of the recorded portions.

Consequently, when the additional recording is thus performed, the address information posterior to the 26 EFM frames of the data 3 in FIG. 2 is recorded in the start portion as denoted by solid lines in succession to the preceding record portion. More specifically, the address information of the last frame of the preceding record data is recorded properly as the data of one frame at the joint.

In this embodiment, the subcode of the next frame subsequent to the frame being recorded is stored in the address information memory 6 and also in the memory of the other subcode generator 5, so that at a stop of the recording operation, the subcode information of the last frame of the preceding record data is stored and held in the memories. However, the circuit configuration may be so modified that the subcode of the frame immediately anterior to the 1-frame subcode supplied to the record signal processor 1 is stored in both the address information memory 6 and the memory of the other subcode generator 5, whereby the subcode of the frame immediately anterior to the last frame is recorded at a stop of the recording operation.

In this case, the address information generator 4 and the other subcode generator 5 generate subcode of the next frame out of the subcode stored in the respective memories. Upon completion of transferring such subcode to the record signal processor 1, the content in the address information memory 6 is rewritten so that the updated subcode is stored. Consequently, when the recording operation is restarted, subcode of the last frame of the preceding record data is produced in the generators 4 and 5 in accordance with the contents in the address information memory 6 and the memory of the other subcode generator 5, and such subcode is supplied to the record signal processor 1. Then, similarly to the procedure mentioned above, the data subsequent to the 26 EFM frames is joined to the preceding record portion so that the proper subcode is recorded at the joint as well.

Posterior to the joint, a CD format signal is formed through the ordinary process with regard to the new record data inputted to the record signal processor 1, and the recording operation is performed continuously.

In the embodiment of FIG. 1 where the additional recording is performed in succession to the preceding record portion without replacement of the disc, the preceding stop position for restart of the additional recording can be detected from the content stored in the address information memory 6. Therefore, if the address information memory 6 is backed up with a battery or the like, it becomes possible to achieve easy detection of the preceding stop position even after the power supply is switched off.

However, in case the disc is replaced with a new one after a halt of the recording operation, the content in the address information memory 6 is not correlated to the recorded data on the new disc, so that the preceding stop position on the new disc and the address information of the last frame of the recorded data thereon are unknown.

Figure 3:
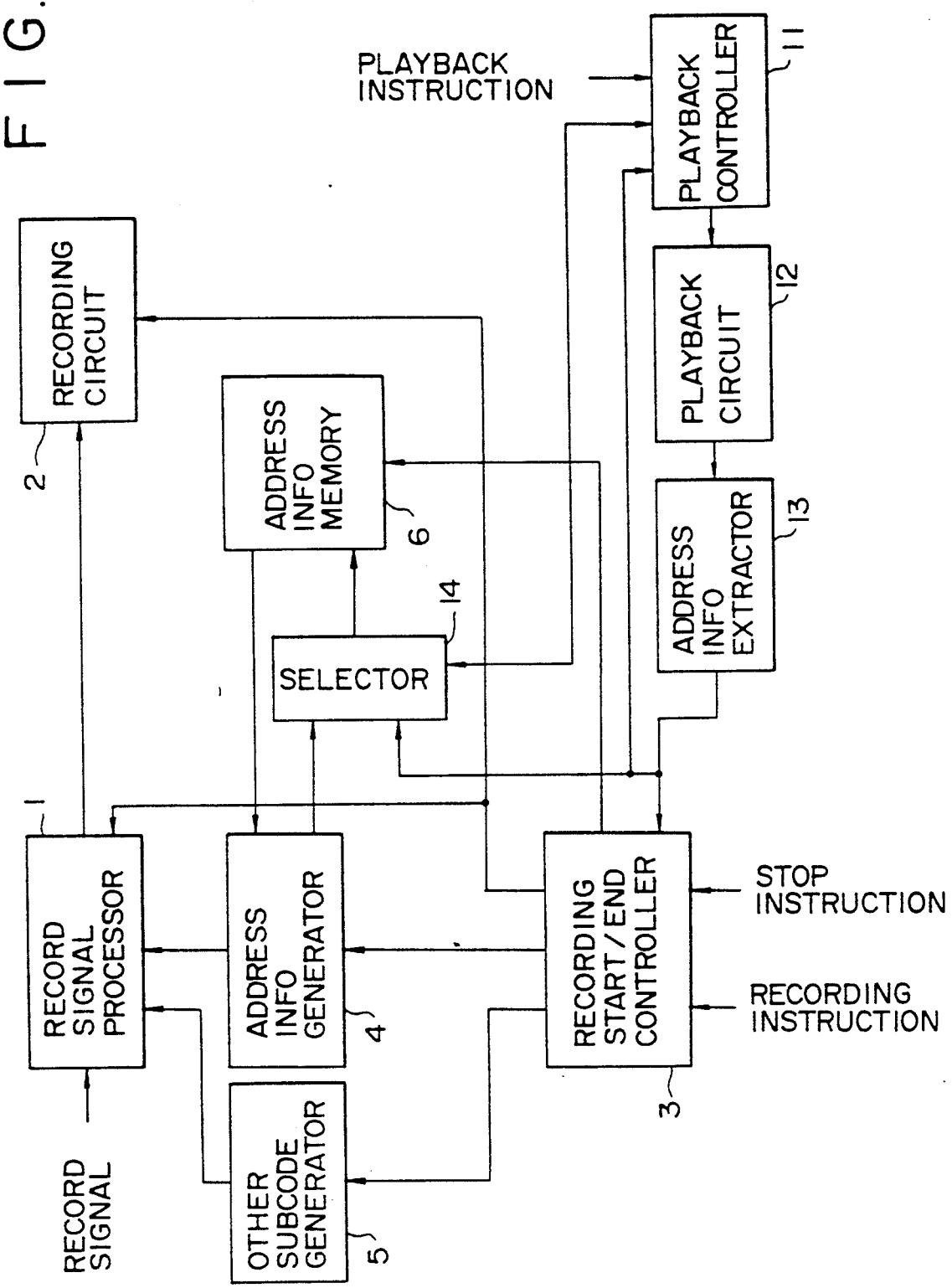
FIG. 3 is a block diagram of another embodiment representing the optical recording apparatus of the present invention.
Figure 4:
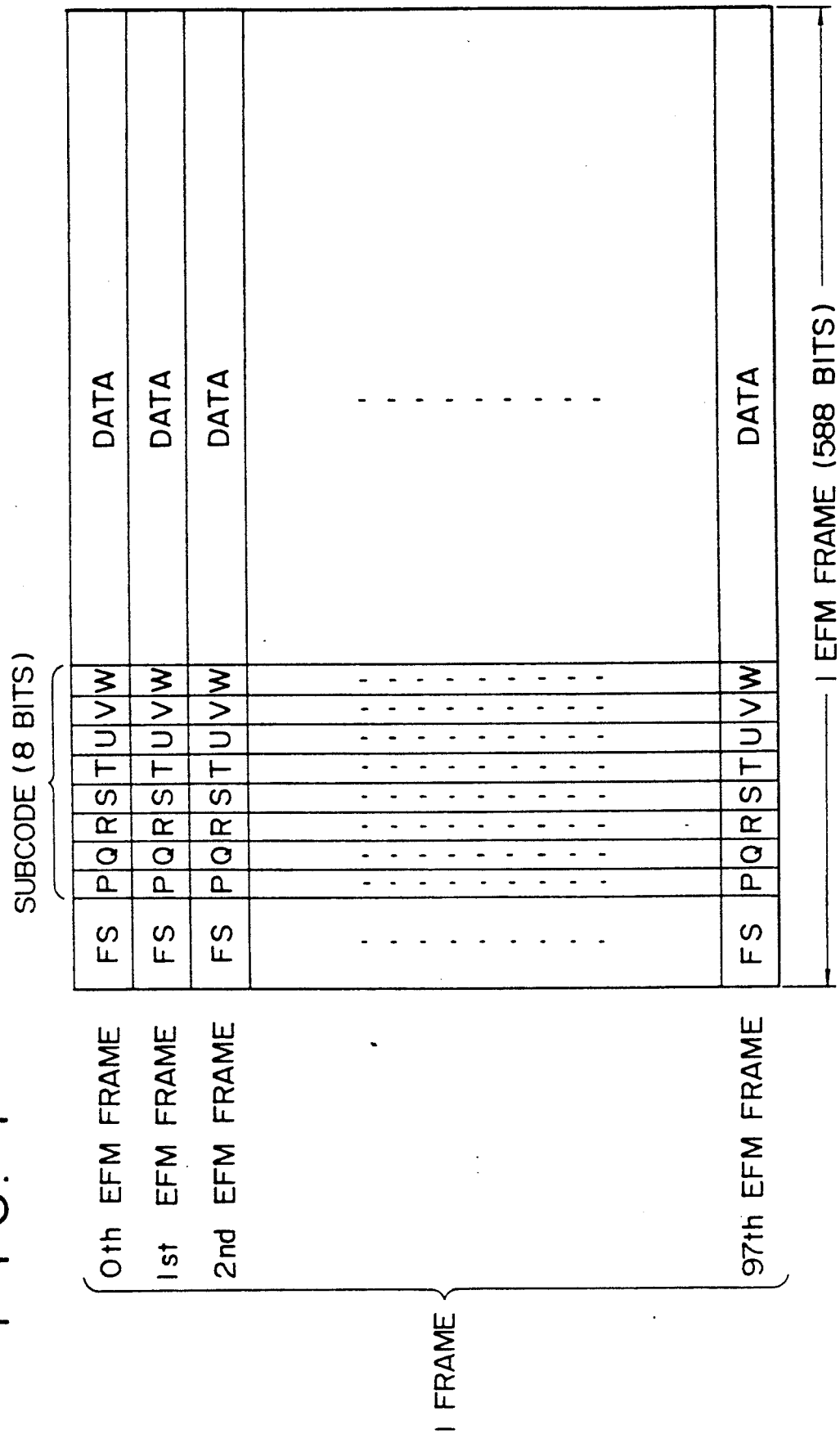
FIG. 4 is a schematic diagram showing a signal format recorded on a compact disc.

FIG. 3 is a block diagram of a second embodiment representing the optical recording apparatus of the present invention contrived in connection with the problem mentioned above. In this embodiment, the same component circuits as those employed in the first embodiment of FIG. 1 are denoted by the same reference numerals.

In the second embodiment, the disc is played back prior to start of an additional recording operation, and the preceding stop position is detected. For detection of such recording stop position, there is known a method which monitors the reproduced RF output obtained by playing back the disc. More specifically, the preceding record end point can be detected from the presence or absence of such reproduced RF output. In the compact disc, an absolute address indicating the first recording position thereon can be recorded in the innermost circumferential portion of the disc. Therefore, it becomes possible to detect the preceding record end point from the information of the absolute address in such innermost circumferential portion and the subcode Q in the recorded data or from the absolute address recorded previously as a preprove on the disc.

In the second embodiment of FIG. 3, when a recording instruction is supplied to a recording start/end controller 3, a playback instruction is supplied to a playback controller 11 prior to start of an additional recording operating. Then the disc is set in a playback state by the playback controller 11, and a playback circuit 12 is placed in operation. Thereafter the reproduced signal obtained from the playback circuit 12 is supplied to an address information extractor 13, which then extracts the address information (subcode Q) from the reproduced signal. The address information thus extracted is supplied to the playback controller 11 where the preceding record end point is searched by, e.g., detecting the aforementioned latter recording stop position.

Upon detection of the recording end position, the address information anterior by one frame to the last frame of the halfway recorded data is supplied via a selector 14 to the address information memory 6 and is stored therein. The selector 14 is controlled by a selection control signal outputted from the playback controller 11 in such a manner that the selector 14, which is normally set in a state to select the address information from the address information generator 4, is so changed as to select the address information from the address information extractor 13.

The output of the address information extractor 13 is supplied to the recording start/end controller 3. Upon detection of the recording restart position from the extracted address information, the controller 3 places the apparatus in the recording mode and outputs a recording start command to the record signal processor 1, and the address information generator 4 and the other subcode generator 5. In response to such command, the address information generator 4 produces, out of the address information from the memory 6, the address information posterior by one frame therefrom, i.e., the address information of the last frame of the preceding record data, and then transfers the generated address information to the record signal processor 1. Similarly, in response to the command from the recording start/end controller 3, the other subcode generator 5 generates the address information of the last frame of the preceding record data and transfers the same to the record signal processor 1.

Meanwhile the record signal processor 1 generates 1-frame of data out of such subcode data. Upon arrival of the recording restart position as shown in FIG. 2, the recording start/end controller 3 outputs a recording restart command to both the record signal processor 1 and the recording circuit 2, thereby restarting the recording operation. In this stage, the recording start/end controller 3 supplies to the recording circuit 2 merely the data posterior to the 26 EFM frames as the first frame data. Therefore, the data posterior to the 26 EFM frames is recorded on the disc in succession to the 26 EFM frames of the last frame of the preceding record data. It follows that, with regard to the subcodes, the data of the preceding last frame is completed at the joint of the recorded portions.

Thus, even if the disc is replaced with another or the address information memory 6 and so forth are not backed up with a battery, proper data can be recorded similarly to the above example as the subcode Q at the joint of the additionally recorded portion.

There may be contrived a technique of recording, as the 1-frame subcode at the record joint, the first frame of the information data to be recorded next. In this case, as the subcode of the preceding last frame, there is recorded the subcode relative to the data to be recorded next. However, since a control code CONTROL is included in the subcode Q anterior to the 26 EFM frames of the last frame and is used for prescribing preemphasis and so forth, it follows that the condition for the next record data is restricted, and consequently such technique is not desirable. Another probable technique of recording the subcode relative to the next record data signifies prediction of the future and is therefore not practical.

In the record signal processor 1, it is not exactly necessary to prepare the entire data of the first frame at the recording restart point, and the requirement can be met by generating merely the data posterior to the 26±1 EFM frames.

The constitution may be so modified that the above operation of placing the recording apparatus in a playback mode after change of a disc and detecting the preceding record stop position is performed regardless of a recording start instruction every time a disc is loaded in the apparatus.

It is to be understood that the present invention is applicable not only to a write-once type CD recording apparatus but also to any other apparatus based on such a system as to record additional information data whose unitary frame is composed of a plurality of bits, wherein the recording operation is halted halfway through the unitary frame of the additional information data.

As described hereinabove, according to the present invention which employs a method of halting a recording operation halfway through the unitary frame of additional information in the optical recording apparatus, the remaining portion of the preceding last unitary frame of the additional information is recorded in succession to the preceding recorded portion at the start of an additional recording mode, so that the proper unitary frame of the additional information can be recorded exactly at the joint of the preceding and present record portions. Consequently, in case such additional information is the address information for example, it is possible to achieve correct reproduction of the address information without fail, hence realizing fast search inclusive of cueing and so forth.

What is claimed is:

1. An apparatus for recording additional information with a record signal on a recording medium, the apparatus comprising:
   receiving means for receiving the record signal;
   first generating means for generating first additional information;
   a first memory for storing at least a remaining portion of the first additional information obtained from the first generating means;
   recording means for recording the first additional information and the record signal on the recording medium; and
   control means for controlling operations of the first generating means, the recording means and the first memory, the control means controlling the first generating means and the recording means to stop operation of the recording means after a first portion of the first additional information obtained from the first generating means is recorded on the recording medium, the control means further controlling the recording means and the first memory to restart operation of the recording means so that the remaining portion of the first additional information from the first memory can be recorded in succession to the first portion of the first additional information.

2. The apparatus according to claim 1, wherein the first additional information data is composed of a plurality of bits.

3. The apparatus according to claim 1, wherein the recording means comprises:
   means for converting the input record signal and the input first additional information into a predetermined format signal and format additional information to be recorded on the recording medium; and
   means for recording the predetermined format signal and format additional information on the recording medium.

4. The apparatus according to claim 1, wherein the control means controls the first generating means so as to generate (n+1)th first additional information (in which n is an integer) when the recording means records n-th first additional information on the recording medium.

5. The apparatus according to claim 1, further comprising:
   second generating means for generating second additional information; and
   a second memory for storing at least a remaining portion of the second additional information;
   wherein the control means further controls the second generating means and the recording means in a manner to stop operation of the recording means after a first portion of the second additional information obtained from the second generating means is recorded on the recording medium, the control means further controlling the recording means and the second memory to restart operation of the recording means in such a manner that the remaining portion of the second additional information from the second memory can be recorded in succession to the first portion of the second additional information.

6. The apparatus according to claim 5, wherein the control means further controls the second generating means so as to generate (n+1)th second additional information (in which n is an integer) when the recording means records n-th second additional information on the recording medium.

7. An apparatus for recording additional information with a record signal on a recording medium, the apparatus comprising:

receiving means for receiving the record signal;

first generating means for generating first additional information;

recording means for recording the first additional information and the record signal on the recording medium; reproducing means for reproducing the first additional information and the record signal from the recording medium;

first detecting means for detecting the first additional information recorded at a record end position on the basis of a reproduced record signal having been recorded with the first additional information, the reproduced record signal reproduced by the reproducing means, the detecting means thereby generating first detection data;

selecting means for selecting between the first additional information obtained from the first generating means and the first detection data, thereby generating first selection data;

a first memory for alternatively storing the first additional information obtained from the first generating means and the first selection data;

control means for controlling operations of the first generating means, the recording means, the reproducing means, the first selecting means, and the first memory, the control means controlling the first generating means and the recording means to stop operation of the recording means after a first portion of the first additional information obtained from the first generating means is recorded on the recording medium, the control means further controlling the recording means and the first memory to restart operation of the recording means in such a manner that a remaining portion of the first additional information from the first memory can be recorded in succession to the first portion of the first additional information in response to the first detection data.

8. The apparatus according to claim 7, wherein the first additional information is composed of plurality of bits.

9. The apparatus according to claim 7, wherein the recording means comprises:

converting means for converting an input record signal and an input first additional information into a predetermined format signal and format additional information to be recorded on the recording medium; and means for recording the format signal and format additional information on the recording medium.

10. The apparatus according to claim 7, wherein the control means further controls the generating means so as to generate (n+1)th first additional information (in which n is an integer) when the recording means records n-th first additional information on the recording medium.

11. The apparatus according to claim 7, further comprising:

second generating means for generating second additional information;

second detecting means for detecting the second additional information recorded at a record end position on the basis of the reproduced signal having been recorded with the second additional information, the record signal reproduced by the reproducing means, the second detecting means thereby generating second detection data;

second selecting means for selecting between the second additional information obtained from the second generating means and the second detection data, thereby generating second selection data; and a second memory for alternatively storing the second additional information obtained from the second generating means and the second selection data;

wherein the control means controls the second generating means and the recording means to stop operation of the recording means after a first portion of the second additional information obtained from the second generating means is recorded on the recording medium, the control means further controlling the recording means and the second memory to restart operation of the recording means in such a manner that a remaining portion of the second additional information from the second memory can be recorded in succession to the first portion of the second additional information in response to the second detection signal.

12. The apparatus according to claim 11, wherein the control means further controls the second generating means so as to generate (n+1)th second additional information (in which n is an integer) when the recording means records n-th second additional information data on the recording medium.

13. An apparatus for recording additional information together with record signals on a recording medium in a recording system in which the additional information and record signals are stored in frames and in which only a portion of a frame is recorded when recording is halted, the apparatus comprising:

receiving means for receiving a record signal;

generating means for generating additional information having a first portion and a remaining portion;

memory means for storing at least the remaining portion of the additional information generated by the generating means;

recording means for recording the additional information and the record signal on the recording medium in a unitary frame, the unitary frame having a first portion and a remaining portion; and control means for controlling operations of the generating means, the recording means, and the memory means, the control means controlling the generating means and the recording means to stop operation of the recording means after the first portion of a last incomplete unitary frame is recorded on the recording medium, the last incomplete unitary frame containing the first portion of the additional information obtained from the generating means, the control means further controlling the recording means and the memory means to restart operation of the recording means such that the remaining portion of the last incomplete unitary frame is recorded in succession to the first portion of the last incomplete unitary frame, the remaining portion of the last incomplete unitary frame containing the remaining portion of the additional information, the remaining portion of the additional information having been stored in memory.

14. The apparatus according to claim 13, further comprising:

reproducing means for reproducing the additional information and the record signal from the recording medium; and detecting means for detecting detected additional information, the detected additional information being additional information recorded in a last complete unitary frame, the last complete unitary frame being the last unitary frame having both its first portion and its remaining portion previously recorded on the recording medium;

the memory means further for storing detected additional information;

the control means further for controlling the generating means, the memory means, and the detecting means so that the generating means generates subsequent additional information, the subsequent additional information being additional information that follows the detected additional information, whereby the remaining portion of the subsequent additional information corresponds to the first portion of the additional information contained in the first portion of the last incomplete unitary frame, the control means further controlling the recording means and the memory means to restart operation of the recording means so that the remaining portion of the last incomplete unitary frame is recorded in succession to the first portion. of the last incomplete unitary frame, the remaining portion of the last incomplete unitary frame containing the remaining portion of the additional information stored in the memory.

15. The apparatus according to claim 13, wherein the additional information comprises addressing subcode information.

16. The apparatus according to claim 14, wherein the additional information comprises addressing subcode information.

17. The apparatus of claim 15, wherein the additional information further comprises additional subcode information.

18. The apparatus of claim 13, wherein the recording medium comprises an optical recording medium.

19. The apparatus of claim 14, wherein the recording medium comprises an optical recording medium.

20. A method of stopping and restarting recording on a recording medium in a recording system in which record signals and additional information are formatted and recorded together in frames, the method comprising the steps of:

generating additional information, the additional information having a first portion and a remaining portion;

storing at least the remaining portion of the additional information in a memory;

stopping the recording process by recording the first portion of the additional information on a recording medium in a first portion of a stopped frame;

restarting the recording process by recording the stored remaining portion of the additional information in a remaining portion of the stopped frame, so that a complete frame is created, the complete frame containing the first portion and the remaining portion of the stopped frame and containing the first portion and the remaining portion of the additional information.

21. A method of stopping and restarting recording on a recording medium in a recording system in which record signals and additional information are formatted and recorded together in frames, the method comprising the steps of:

generating additional information, the additional information having a first portion and a remaining portion;

stopping the recording process by recording the first portion of the additional information on a recording medium in a first portion of a stopped frame; and restarting the recording process by
reproducing recorded signals from the recording medium;

detecting preceding information data that is contained in a preceding frame that precedes the stopped frame;

generating at least the remaining portion of the information data using the preceding information data;

recording the remaining portion of the additional information in a remaining portion of the stopped frame, so that a complete frame is created, the complete frame containing the first portion and the remaining portion of the stopped frame and containing the first portion and the remaining portion of the additional information.

22. The apparatus according to claim 1, wherein the recording medium is an optical recording medium and the recording means optically records on the recording medium.

23. The apparatus according to claim 7, wherein the recording medium is an optical recording medium and the recording means optically records on the recording medium.

24. The apparatus according to claim 13, wherein the recording medium is an optical recording medium and the recording means optically records on the recording medium.

* * * * *